July 9, 1968     D. F. E. PIDGEON ETAL     3,391,766

ELECTROMAGNETIC DEVICES

Filed Jan. 25, 1966

INVENTORS
DENNIS FRANK EDWIN PIDGEON
KENNETH WILLIAM DOUGHTY
BY
Hane and Nydick
ATTORNEYS United States Patent Office 3,391,766
Patented July 9, 1968

3,391,766
ELECTROMAGNETIC DEVICES
Dennis Frank Edwin Pidgeon, Letchworth, and Kenneth William Doughty, Biggleswade, England, assignors to International Computers and Tabulators Limited, London, England
Filed Jan. 25, 1966, Ser. No. 522,855
Claims priority, application Great Britain, Feb. 3, 1965, 4,644/65
7 Claims. (Cl. 192—84)

ABSTRACT OF THE DISCLOSURE

An electromagnetic clutch or brake has an annular electromagnet having concentric annular poles to which a disc-shaped armature is attracted to cause frictional engagement between the electromagnet and the armature. The core of the electromagnet is made of a plurality of U-shaped elements of magnetisable material arranged in a ring with one end of each element forming one pole and the other end of each element forming the other pole. The elements are insulated from one another and held together by embedding them in synthetic resin. An energising coil lies in an annular recess between the poles which is bounded by the U-shaped elements. The U-shaped elements may be formed individually or the core may be formed by winding magnetisable wire around an annular former to produce a toroidal winding, embedding the winding in synthetic resin and then dividing the embedded winding into two annular cores each being of U-section.

The present invention relates to electromagnetic devices, and particularly to devices operable to control the transmission of rotary motion.

Devices for controlling the transmission of rotary motion by the appropriate energisation of electromagnets have previously been proposed and have commonly taken the form of electromagnetically controlled clutches and brakes. In a previously proposed form of construction such clutches and brakes include a first magnetisable member in the form of a ring of magnetisable material having an annular recess in which an electromagnet coil is contained. In the simplest case a second magnetisable member is provided in the form of a disc, both members being faced with a material having a high coefficient of friction. Energisation of the coil then produces frictional engagement of the two members. In operation as a brake, one of the members is rigidly fixed while the other is secured to a shaft which is to be braked, while in operation as a clutch, one member is secured to a driving shaft and the other is secured to a shaft which is to be driven. In other forms of such devices, particularly clutches, it has been found convenient, in order more easily to provide electrical connections to the magnet coil, to ensure that the member containing the coil always remains static. Under these conditions an intermediate magnetisable member may be provided between the first and second members, and the effective engagement faces are, in this case, those between the intermediate and second members, the intermediate member providing an extension of the magnetic path between the first and second members. Hence, in this case, motion transmission control is effected between the intermediate and second members by the appropriate energisation of the coil contained in the first member.

Electromagnetic devices of the forms described above are frequently used in data processing equipment and one example of such use occurs in output printing apparatus. It has been found, however, that as the required speed of operation of such apparatus is increased, one factor limiting the speed realisable in practice has been the relatively low operating speed of the electromagnetically operated clutches and brakes. In the previously known examples of such devices the first magnetisable member has been formed wholly of magnetisable material, usually soft iron.

It is an object of the present invention to provide an improved electromagnetic device operable to control the transmission of rotary motion.

It is a further object of the invention to provide an improved method of manufacturing a magnetisable member for use in an electromagnetic device.

According to one aspect of the present invention, an electromagnetic device operable to control the transmission of rotary motion includes at least two friction members engageable to control said transmission; a first magnetisable member formed of a plurality of electrically-insulated elements of magnetisable material; a coil positioned in an annular recess in said first member and energisable to magnetise said first member; and a second magnetisable member operable to cause engagement of said friction members under the influence of the magnetisation of said first member.

Apparatus embodying the present invention will now be described, by way of example, with reference to the accompanying drawing in which:

FIGURE 2b shows in greater detail a part of the member of FIGURE 2a.

For convenience, in the following description the device will be described in the form of an electromagnetic clutch, but the same form of construction might alternatively be used as a brake, one member of the device then being rigidly fixed. For this reason the term "electromagnetic device operable to control the transmission of rotary motion" should be taken as including both clutch and brake devices.

Figure 1:
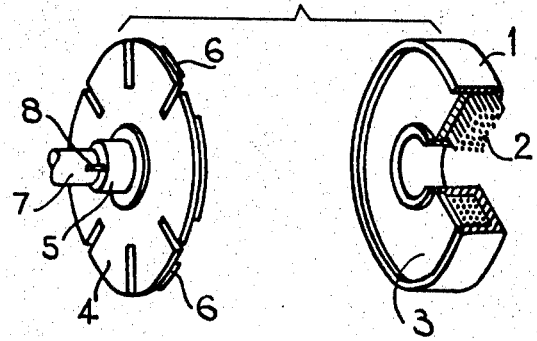
FIGURE 1 shows, diagrammatically, an electromagnetic device for controlling rotary motion.

Referring now to FIGURE 1 of the drawing, a clutch consists of a ring-shaped magnetisable member 1 of substantially U-shaped cross-section. An electromagnet coil 2 is contained within the annular recess formed by the arms of the U. A ring 3 of material having a high coefficient of friction is inserted in the recess over the coil 2. The member 1 is used in conjunction with a second magnetisable member 4, which is a disc of magnetisable material having a central hub 5. Attached to the member 4 are pads 6 of material having a high coefficient of friction, and the member 4 is mounted on a shaft 7 by means of the hub 5. The shaft 7 is splined or has a keyway cut in it, and the hub 5 is arranged to mate with the shaft, for example by means of a key 8, so that a small amount of axial movement is permitted to the member 4. In an alternative form of construction the member 4 is secured to the shaft 7 but is sufficiently flexible to allow slight axial movement of the periphery relative to the hub. It will be appreciated that the parts of the device are shown separated in FIGURE 1 for clarity of illustration, but in practice the ring 3 and the pads 6 are spaced apart sufficiently to allow relative rotary movement of the members 1 and 4.

In operation of the device, the member 1 is rotated by a driving shaft (not shown). Since the pads 6 are disengaged from the disc 3 no rotation is imparted to the member 4. If the coil is now energised, the member 1 is magnetised and the member 4 is attracted towards the member 1, causing engagement of the pads 6 with the ring 3 and consequent rotation of the member 4 and the shaft 7.

Although the device has been described above as a clutch, it may alternatively be used as a brake. In this case the member 1 is rigidly mounted axially in line with the shaft 7 and with the pads 6 closely spaced relative to the ring 3. In this state the shaft 7 is free to rotate. If, however, the coil 2 is now energized, the friction pads 6 are brought into contact with the ring 3, thereby applying a braking force to the member 4 and hence to the shaft 7.

In order to improve the speed of operation of these devices, the member 1 is made as a composite structure in which individual elements of magnetisable material are separated from one another by an electrically insulating material to prevent the circulation of eddy currents round the member. It has been found that with the composite form of construction now proposed, the speed of operation may be improved by up to some 20% compared with the previously known devices operated under similar conditions.

Figure 2A:
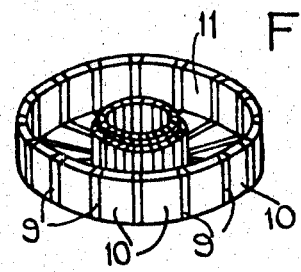
FIGURE 2a shows a form of composite magnetisable member for use in the device.
Figure 2B:
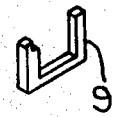

FIGURES 2a and 2b show one form of construction for the member 1 of FIGURE 1. As shown in FIGURE 2a, a number of separate lengths 9 of suitable magnetisable material, such as soft iron, are arranged in a ring. Each length 9 is folded into substantially U-shaped form as shown in FIGURE 2b, and the ring is preferably formed by positioning the lengths 9 about a suitable former so that each length lies in a generally radial direction relative to the former. The voids between the lengths are then filled with an insulating material 10. A satisfactory method of manufacture consists in enclosing the former with the lengths 9 spaced round it in a suitable mould and pouring in a synthetic resin adhesive. This resin material, when set, then serves both to space the lengths 9 apart and to secure the lengths in position to form a solid composite structure. The structure is then removed from the mould and the former withdrawn, leaving a composite magnetic member 1 of substantially cylindrical form having an annular recess 11 in one end face. In order to produce a clean and smooth face at this end, the member 1 is then subjected to a mechanical finishing operation.

It will be appreciated that instead of pre-forming the lengths 9 of magnetisable material it is possible to fold all these lengths 9 about a suitable former simultaneously in a single press operation, the press die then acting as the former.

Figure 3A:
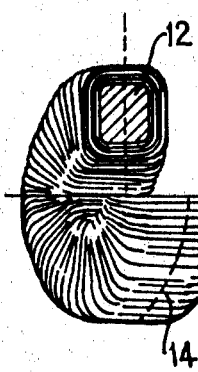
FIGURE 3a shows a partly cut away view of a winding for use in the manufacture of an alternative form of composite magnetisable member.
Figure 3B:
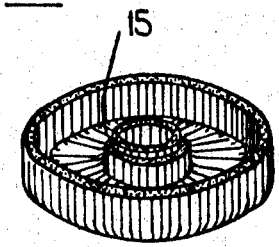
FIGURE 3b shows a composite magnetisable member.

Referring now to FIGURES 3a and 3b of the drawing, in an alternative method of manufacture of the member 1 a ring-shaped former 12 is wound with a continuous length of magnetisable material 13 in strip or wire form. Such a winding is commonly referred to as a toroidal winding. It will be appreciated that although the winding shown in FIGURE 3a is formed completely round the former 12, the winding may instead be located only at spaced-apart points round the ring or that a number of separate windings may be provided in this manner. In either case each turn of the winding or windings is to be regarded as forming a separate length of magnetic material.

The toroidal winding thus formed is then impregnated with an insulating medium, such as a synthetic resin. This operation may be accomplished either by enclosing the winding in a suitable mould, as in the previous case, or by dipping as in conventional impregnating operations. Although the winding is impregnated in this manner, the turns of the winding may also be electrically insulated from adjacent turns by forming the winding from magnetisable material which is pre-coated with insulating material.

After the application of the insulating medium to the winding, the former 12 is removed. This operation involves cutting part of the toroidal winding away to release the former. In the simplest case, one face of the toroid is removed. However, by cutting along the centre line of the assembly, as indicated by the dotted line 14 in FIGURE 3a, two similar composite members 1 are formed after removal from the former 12. By carefully controlling this cutting operation, it is possible to produce a satisfactory surface on both members 1 so that it is then unnecessary to perform a final mechanical finishing operation, the finishing operation in this case being a part of the operation of removing the former. However, it is frequently required to provide a particular configuration to the end face of the composite member 1, such as the step 15 shown in FIGURE 3b, for the location of the ring 3 of friction material (FIGURE 1). In this case, a final finishing operation will still be required.

In a further method of manufacturing the member 1 from electrically insulated elements, iron dust particles are mixed with a suitable resin and hardener and the mixture is poured into a mould and allowed to set. By this method a shape such as that shown in FIGURE 3b may be produced in a single operation. Alternatively, any other suitable shape may be formed.

What is claimed is:

1. An electromagnetic device operable to control rotary motion of a rotatable member including a first member having a first surface; first and second annular magnetic pole faces concentric with one another on said first member; said first member having an annular recess opening between said first and second pole faces; an energising coil located in said recess; said first member including a plurality of magnetisable elements electrically insulated from one another in a circumferential direction and effective to provide magnetic paths between said first and second pole faces which paths are electromagnetically coupled with said coil; a second magnetisable member co-operating with said pole faces and having a second surface adjacent said first surface; energisation of said coil being effective to cause frictional engagement between said first surface of the first member and said second surface of the second member.

2. A device as claimed in claim 1 in which said first member includes a plurality of open ended substantially U-shaped elements of magnetisable material arranged in a ring; the first pole face being constituted by one end of the U-shaped elements and the second pole face being constituted by the other end of the U-shaped elements.

3. A device as claimed in claim 2 in which the first member includes a moulding of synthetic resin, said moulding being effective to secure the U-shaped elements in fixed relationship to one another.

4. A device as claimed in claim 1 in which the first member includes a moulding of a mixture of iron dust particles and synthetic resin.

5. A device as claimed in claim 1 in which said first member includes an annular pad of material having a high coefficient of friction, the first surface being on said annular pad.

6. A device as claimed in claim 5 in which said annular pad extends across the opening of the recess.

7. A device as claimed in claim 1 in which the second member carries at least one pad of material on its second surface having a high coefficient of friction.

References Cited

UNITED STATES PATENTS

| 2,893,528 | 7/1959 | Ryba | 192—84 X |
| 3,016,580 | 1/1962 | Jaeschke | 192—84 X |

FRED C. MATTERN, Jr., *Primary Examiner.*

ARTHUR T. McKEON, *Examiner.*